UNITED STATES PATENT OFFICE.

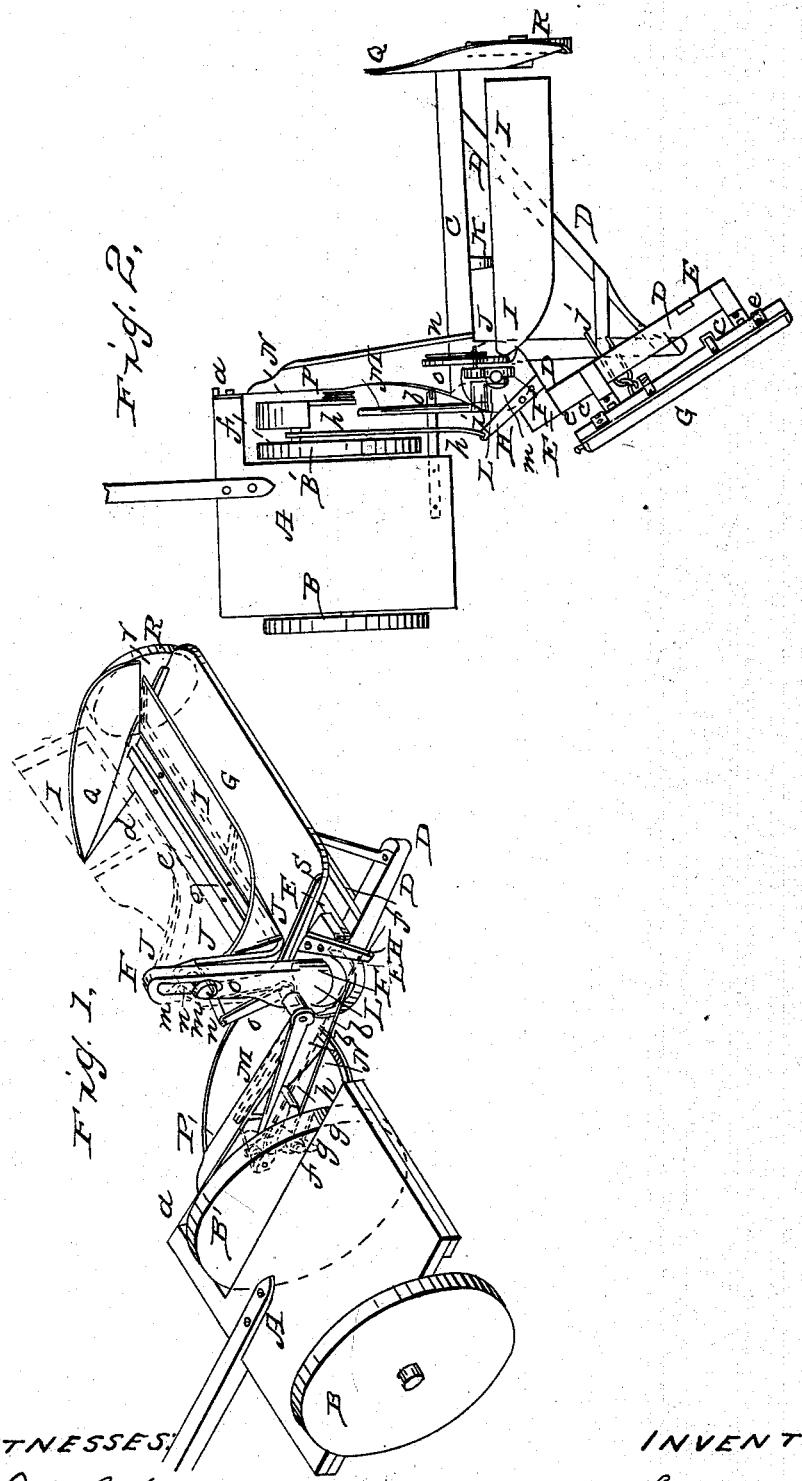

HENRY FISHER, OF CANTON, OHIO, ASSIGNOR TO C. AULTMAN & CO., OF SAME PLACE.

IMPROVEMENT IN REAPING-MACHINES.

Specification forming part of Letters Patent No. 49,194, dated August 1, 1865.

*To all whom it may concern:*

Be it known that I, HENRY FISHER, of Canton, in the county of Stark and State of Ohio, have invented a new and useful Improvement in Self Rakes or Droppers for Harvesting-Machines; and I do hereby declare that the following is a full, clear, and exact description of the construction and operation of the same, reference being had to the accompanying drawings, making a part of this specification, in which—

Figure 1 represents, in perspective, so much of a harvesting-machine with the self rake or dropper attached as will illustrate the invention. Fig. 2 represents a top plan of the same, but with the parts in a position different from that in Fig. 1.

Similar letters of reference, where they occur in the separate figures, denote like parts in both drawings.

This invention relates to a grain-table that is caused to swing around automatically and deliver the gavel of grain on the ground in or near the path of the main frame and behind it, so as to be out of the way of the next round of the machine, and, in connection with such a horizontal swinging and dumping grain-table, a holding device that is also operated automatically and in unison therewith, and which rises up out of the way of the falling grain while a gavel is being gathered on the table, and when the table starts to swing around to drop its load this holding device descends and catches the falling grain until the table returns, when it discharges the grain which it has caught and held upon the table, and again swings up out of the way; and my invention consists, first, in a swinging and dumping table, operated from the main wheel or wheels of the machine, and having the motions substantially as herein described; and my invention further consists in the hinged front section of the table, which is caused to rise and fall at stated periods, and for a purpose to be hereinafter described; and my invention further consists in combining with a swinging and dumping table a rising-and-falling holding device, that will hold the falling grain while the table is dropping its load, and then deliver the grain which it has caught and held onto the table after it has returned, and itself move upward out of the way until again needed.

To enable others skilled in the art to make and use my invention, I will proceed to describe the same with reference to the drawings.

A may represent a portion of a main frame, and B B' the supporting-wheels thereof, of which the one, B', is also a driving-wheel, though both wheels may also be drivers. The finger-bar C and the platform or table-frame D may be united to the main frame by a pivoted connection at $a$ and another at $b$, so that the cutting apparatus may conform to the ground over which it passes independent of the main frame.

A bar E is pivoted around the shank of the standard F, and on this bar E is hinged the table G, as at $c$, so that it (the table) may not only swing around horizontally, or nearly so, with the bar E, but also have a dumping or tilting motion independent of the swinging bar, so as to deposit or drop the gavel upon the ground. The front portion, $d$, of the table is hinged to the main portion G, as at $e$, so that this hinged portion may rise up to form a ledge or tray for holding and carrying back the grain to be dropped; and when the table is again returned into position for receiving the falling grain this hinged portion is dropped down level with the main table again.

The table is operated as follows: On the drive-wheel B' there is a wrist-pin, $f$, over which a loop, $g$, on the forward end of a connecting-rod, $h$, works, the rear end of the connecting-rod $h$ being united at $i$ to an arm or lever, H, projecting from the swinging bar E, so that every revolution of the driving-wheel B' swings around the table, where it is dumped, and returns it again to position for receiving another load; but the table may be so geared as to swing oftener or less often, as may be desired. When the table has swung around into the position where it is to drop the grain a hook or projection, $j$, united by a link to the table, catches against the frame D, and thus draws down the rear portion of the table and causes it to discharge its load. As the table starts forward again it comes down into a horizontal, or nearly so, position, and when it arrives at its most forward position the hinged portion $d$ is thrown down by a projection, k, fastened to the finger-beam C, which strikes another projection, l, on the hinged portion d.

The wing, sword, or holding device I is operated as follows: In the upper portion of the standard F there is a slot, in which, by means of a wrist and button, m, the arm J that carries the wing, shield, or holding device I can rise and fall. Lower down in the standard there is supported a rock-shaft, L, to which is fastened an arm, M, that extends forward, and is operated by a cam, N, on the end of the wrist-pin f, and this cam N, through the arm M, is the means of moving or rocking the shaft L. On the shaft L, and on the opposite side of the standard from the arm M, there is another arm, O, the upper end of which is connected by a link or bar, n, to the arm J, so that by this mechanism the arm J, and consequently the shield I, is first raised up to the upper end of the slot in the standard F, and then it swings or turns in an upward direction, raising the shield clear up out of the way of the falling grain. As arranged, every revolution of the drive-wheel B' causes this shield or holding device I to swing clear up out of the way of the falling grain, and returns it into position to catch the falling grain, and it has these motions relatively to the motions of the table, so that while the table is moving out to deliver a gavel, is being dumped, and is returning the shield is holding the falling grain, and when the table has arrived in position to catch the grain the shield delivers what it has upon the table and then moves out of the way until a full gavel is collected, when it again comes into action and the table moves around to again drop its load.

There are the usual inside and outside dividers, P Q, and outside supporting-wheel, R.

The table has ledges r s on its outer and inner sides, so as to make it, when the hinged front portion, d, is turned up, of a tray form, to hold the grain in shape until it is dumped or dropped upon the ground.

Having thus fully described the nature, object, and purpose of my invention, what I claim therein as new, and desire to secure by Letters Patent, is—

1. The swinging and dumping table G, operated automatically by means substantially such as herein described and represented.

2. In combination with a swinging and dumping table, the hinged section d at its front edge, as and for the purpose substantially as herein described.

3. In combination with a swinging and dumping or dropping table, a shield or holder, operating in connection therewith, as and for the purpose described.

HENRY FISHER.

Witnesses:
 ISAAC HAZLETT,
 JOHN TOWNER.